United States Patent [19]

Griffin et al.

[11] Patent Number: 5,304,771
[45] Date of Patent: Apr. 19, 1994

[54] APPARATUS FOR PRECISELY METERING POWDER FOR WELDING

[75] Inventors: Robert Griffin, Orchard Park; James H. Downey, Williamsville; Frederick K. McGee, Hamburg, all of N.Y.

[73] Assignee: D. A. Griffin Corporation, West Seneca, N.Y.

[21] Appl. No.: 837,492

[22] Filed: Feb. 18, 1992

[51] Int. Cl.⁵ ............................................. B23K 26/00
[52] U.S. Cl. ............................ 219/121.63; 219/121.84
[58] Field of Search .................... 219/121.63, 121.64, 219/121.65, 121.66, 121.84

[56] References Cited

U.S. PATENT DOCUMENTS

| | | | |
|---|---|---|---|
| 2,690,493 | 9/1954 | Schaefer | 219/8 |
| 2,886,695 | 5/1959 | Todd | 219/130 |
| 2,907,866 | 10/1959 | Yenni | 219/74 |
| 2,911,517 | 11/1959 | Armstrong | 219/125 |
| 2,938,997 | 5/1960 | Anderson | 219/124 |
| 3,005,899 | 10/1961 | Jensen et al. | 219/60 |
| 3,060,307 | 10/1962 | Arnoldy | 219/130 |
| 3,076,888 | 2/1963 | Arnoldy | 219/73 |
| 3,339,056 | 8/1967 | Crawford | 219/76 |
| 3,735,087 | 5/1973 | Arnoldy | 219/73 |
| 3,804,245 | 4/1974 | Pendelton | 209/240 |
| 4,644,127 | 2/1987 | LaRocca | 219/121 FS |
| 4,647,749 | 3/1987 | Koshy | 219/76.14 |
| 4,730,093 | 3/1988 | Mehta et al. | 219/121.63 |
| 4,804,815 | 2/1989 | Everett | 219/121.6 |

OTHER PUBLICATIONS

"BW-35 Bulkweld System", Installation & Operating Instructions, Triten, 5915 Brittmore, Houston, Tex. 77041.

Primary Examiner—C. L. Albritton
Attorney, Agent, or Firm—Hodgson, Russ, Andrews, Woods & Goodyear

[57] ABSTRACT

Powder feed apparatus for providing a precise flow rate of fine powder for laser welding as well as other welding operations where such precise flow of fine powder is required. The powder is metered by means of at least one wheel rotatable within a housing and having a peripheral edge with at least one plurality of cavities in the peripheral edge. The cavities are substantially evenly spaced entirely about the wheel periphery and sized to hold substantially equal volumes. The peripheral edge has a close clearance with the housing whereby to entrap for delivery to the outlet discrete precise quantities exclusively of the powder in the cavities. A velocity feed-back controlled motor connected to the wheel is provided to precisely control the flow rate of the powder by precisely controlling the motor velocity. More than one plurality of wheel cavities are perferably provided to overlap so as to minimize pulsing of the powder to eliminate a lumpy appearance of the weld for a stronger weld and more aesthetically pleasing weld with the same amount of powder. In order to precisely position the powder stream particularly after a nozzle tip has been replaced a tri-axial cross-slide assembly is preferably provided to fine tune the nozzle tip position.

20 Claims, 6 Drawing Sheets

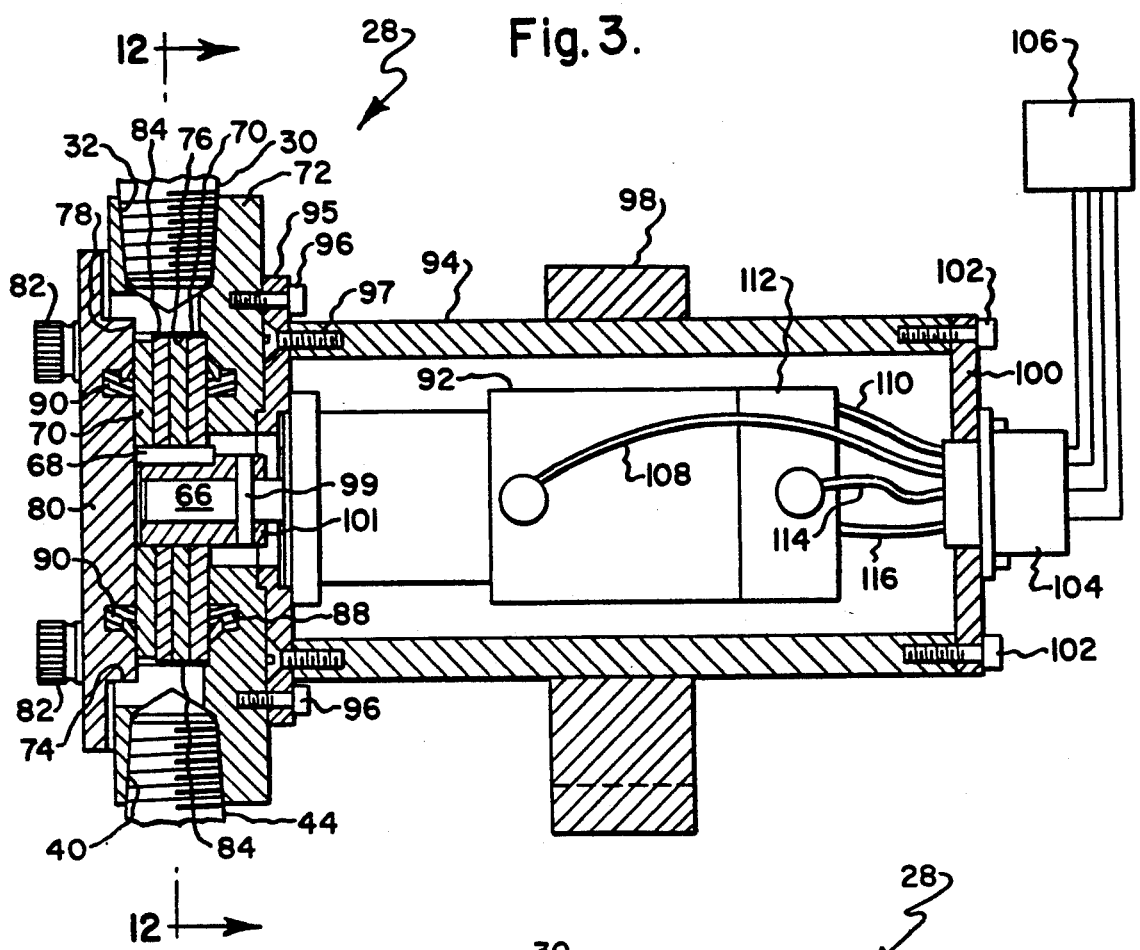
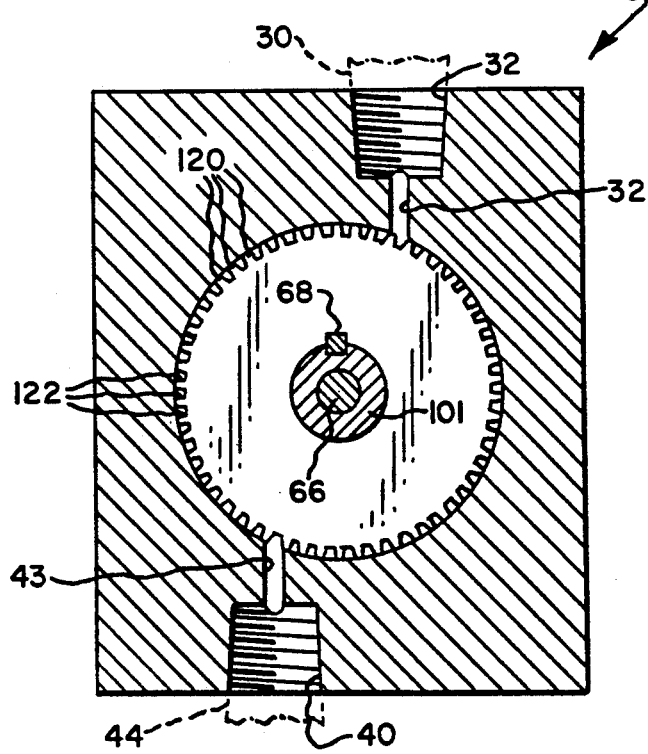

7.105447432
GRAMS/MIN.

APPARATUS FOR PRECISELY METERING POWDER FOR WELDING

The present invention relates generally to welding. More particularly, the present invention relates to powder feed apparatus for laser welding or for other welding operations which require precisely metered powder of a very fine consistency.

Various types of welding apparatus are disclosed in U.S. Pat. No. 2,690,493; 2,886,695; 2,907,866; 2,911,517; 2,938,997; 3,005,899; 3,339,056; 3,804,245; 3,076,888; 3,060,307; 4,647,749; 4,644,127; and 4,804,815.

During welding an additive of metallic material in the form of a rod or powder or the like is added at the site of the weld to form the weld deposit.

In an automatic arc welding process known as "bulk-welding," a continuous consumable electrode and a supplemental filler metal in the granular metal powder form are used for achieving the weld. The metal powder is deposited onto the workpiece slightly ahead of the electrode and is consumed by the advancing molten pool and becomes a part of the weld deposit. Triten Corporation of Houston, Tex. provides a BW-35 Bulkweld System wherein the flow of the powder to the weld is controlled by an electric Metalmeter Model EM-5. The electric Metalmeter device is a motorized wheel rotatable within a housing having a powder inlet and a powder outlet and having a plurality of substantially evenly spaced equal volume cavities in the peripheral edge thereof for filling with the powder at the inlet and for discharging the powder at the outlet. The Triten Metalmeter wheel has 20 evenly spaced cavities in its peripheral edge, and each of the cavities has a volume of about 0.010 cubic inches. U.S. Pat. No. 3,060,307 to Arnoldy also discloses powder for use with metal electrodes for welding wherein the powder flow is controlled by a feed wheel which has a plurality of recesses or pockets formed in its periphery for receiving the powder and discharging it for welding.

Laser powder feed apparatus has been provided which contains such a motorized wheel device for controlling the flow rate of powder to the nozzle tip for application to the weld. Such apparatus includes a heated canister holder with a vibratory system to support interchangeable canisters filled with the powder. Canister pressurization via argon gas along with heat and vibration assist in maintaining the powder in a dry and movable state. The powder is transported via a tube to the motorized wheel device described above for controlling the rate of discharge of powder therefrom. The powder is discharged into another tube for flow to a replaceable nozzle for deposit along the plane of travel, leading the laser impingement point. Optical sensors have been provided to monitor powder flow both leaving the canister and entering the nozzle to thus provide "low powder" and "end of powder" warning signals.

While the laser powder feed apparatus described above allows a good quality laser weld to be achieved, it is considered desirable to further improve the apparatus to provide even higher quality welds. In this regard, the laser welding process requires a very fine atomized powdered metal media of a spheroidal size which may approximate 0.003 to 0.007 inch. The very fine character of the powder increases the difficulty of achieving flow rate consistency to the weld. The more inconsistent the flow rate, the greater is the difference in weld quality along the weld. Inspections of the welded workpiece reveal such differences in weld quality. It is therefore desirable to provide a more consistent powder flow rate. In addition, the location of impingement of the powder on the workpiece relative to the weld will also affect weld quality. However, from time to time the nozzle may require replacement, and the location of the tip of the replacement nozzle may be slightly different from the location of the tip of the replaced nozzle with the result that the powder will impinge the workpiece at a slightly different location for a lesser weld quality. It is thus considered desirable to be able to locate the tip so that the powder impinges the workpiece at a precise location determined to be the optimum location for a high quality weld.

It is accordingly an object of the present invention to more precisely meter the flow of powder in a powder feed apparatus for a higher quality weld.

It is another object of the present invention to more precisely direct the powder stream from the nozzle tip for more effective welding results.

In order to precisely control the powder flow rate, in accordance with the present invention the powder is metered by means of at least one wheel rotatable within a housing and having cavity means in the peripheral edge which are substantially evenly spaced and which are sized to hold substantially equal volumes and the wheel having a close clearance with the housing to entrap discrete precise quantities of the powder in the cavities, and the wheel is powered by a velocity feedback controlled motor. In order to precisely direct the powder stream from the nozzle tip, in accordance with the present invention the apparatus further comprises means for tri-axially positioning the nozzle tip. In a preferred embodiment of the present invention the wheel comprises a gear wherein the cavities are provided by the gear teeth.

The above and other objects, features, and advantages of the present invention will become apparent in the following detailed description of the preferred embodiments thereof which should be read in connection with the accompanying drawings wherein the same reference numeral denotes the same or similar parts throughout the several views.

BRIEF DESCRIPTION OF THE DRAWINGS

FIG. 3 is a sectional view taken along lines 3—3 of FIG. 1.

FIG. 12 is a sectional view taken along lines 12—12 of FIG. 3.

DETAILED DESCRIPTION OF PREFERRED EMBODIMENTS

Figure 1:
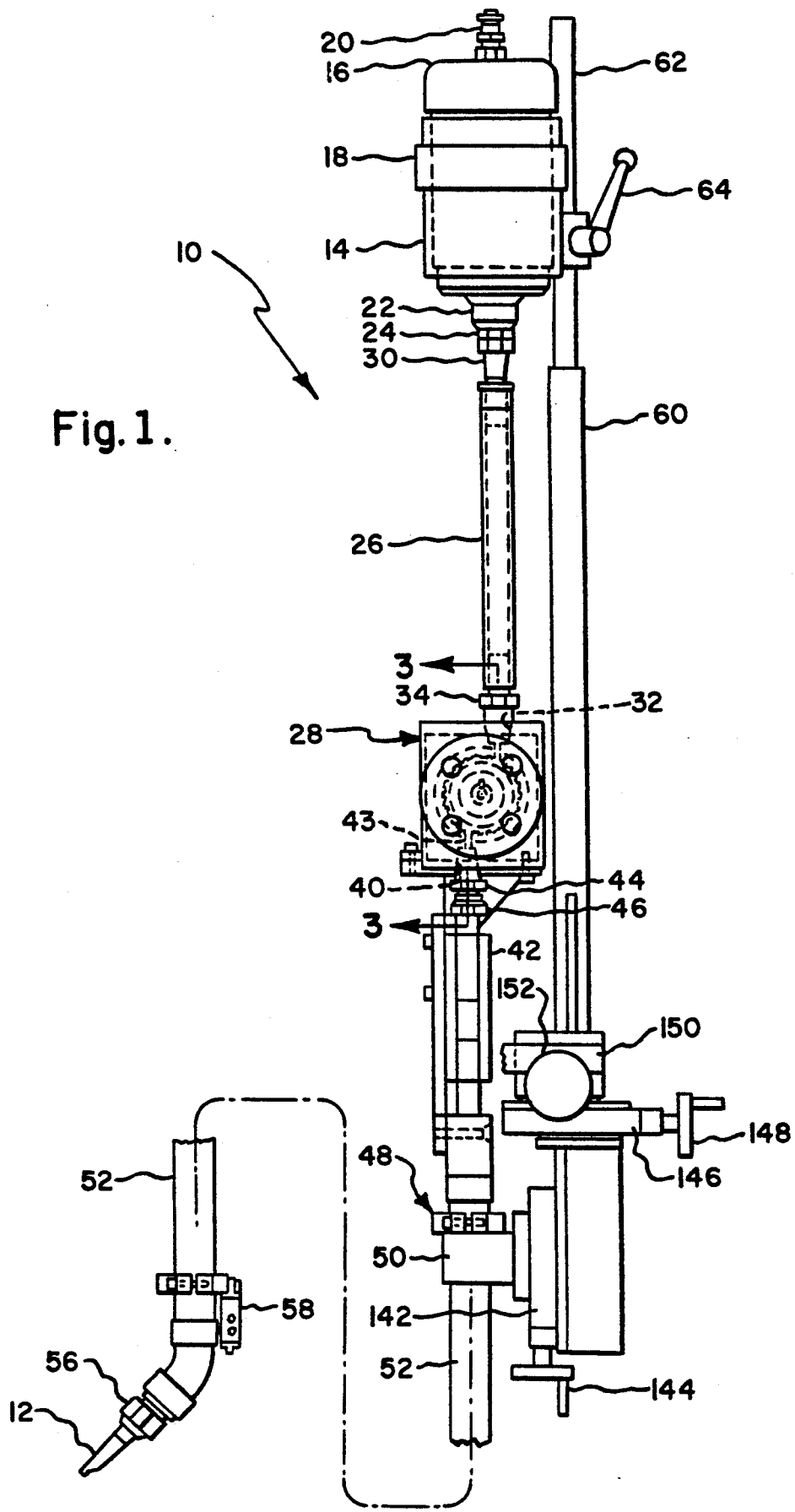
FIG. 1 is a side elevation view of apparatus which embodies the present invention.
Figure 2:
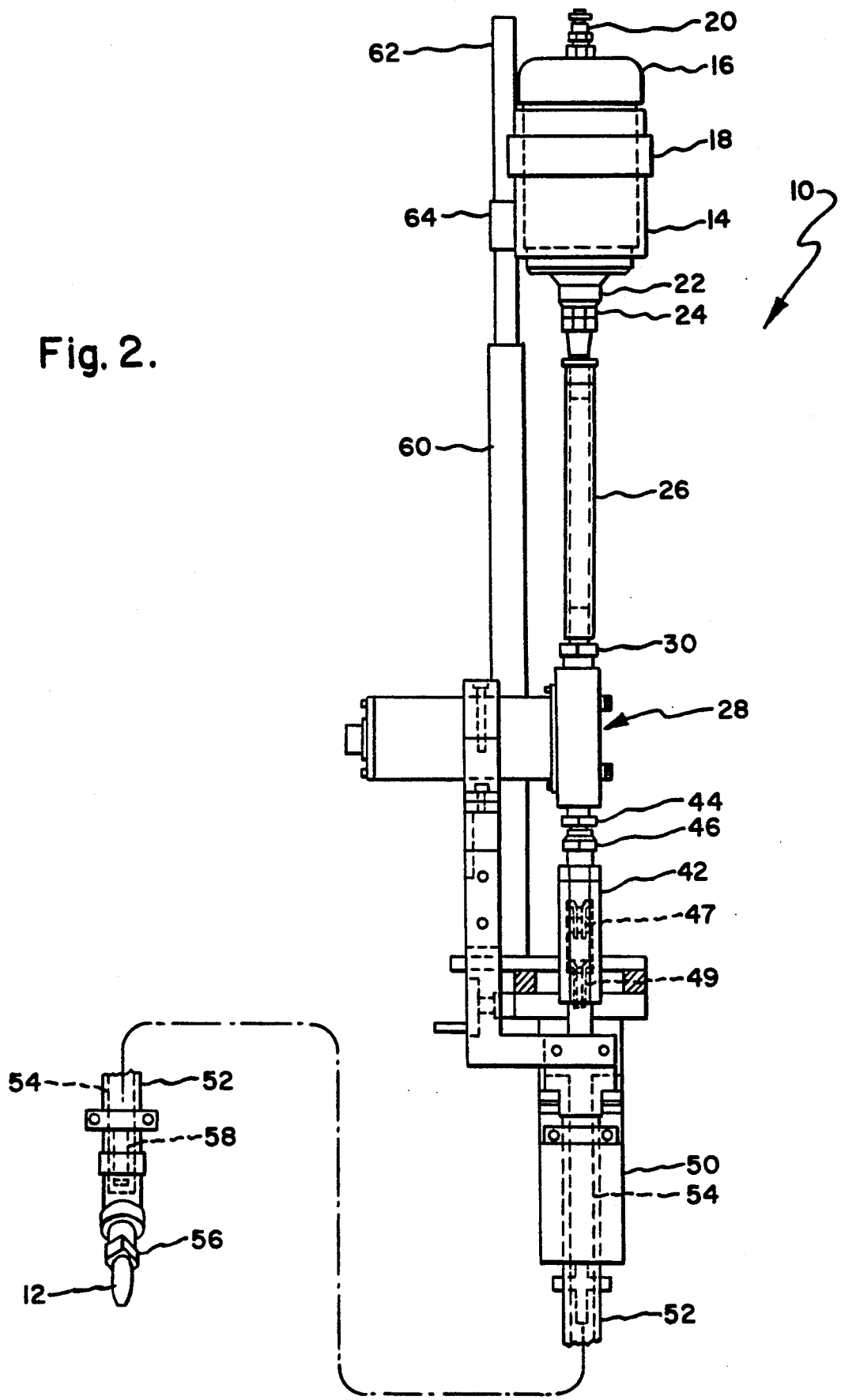
FIG. 2 is a front elevation view of the apparatus of FIG. 1.

Referring to FIGS. 1 and 2, there is shown generally at 10 powder feed apparatus for providing a metallic powder through the end of tip 12 to a weld site to form a weld deposit. Thus, the nozzle tip 12 deposits the powder, illustrated at 17 in FIG. 4, into the path of the laser beam (or other energy source) where it is melted down and fused with a parent metal of the component being over-laid. While the apparatus 10 as described herein is particularly suitable for laser-welding operations wherein precise metering of a powder of very fine consistency is required, it should be understood that it may also be suitable for other kinds of welding operations.

The apparatus 10 includes a canister holder 14 in which is insertable a removable and refillable powder container 16 which may have a capacity of perhaps 50 cubic inches. The powder canister 16 is a sealable, refillable, re-usable container in which the powder is not only shipped but also from which the powder is directly dispensed. The canister holder 14 is used to hold, heat, and to vibrate the contents of the canister 16 in order to facilitate free flow of the fine powder. Heat is supplied to the contents by, for example, a Rama RD88 band heater 18, provided by Rama Corp. of San Jose, Calif. Vibration of the container 16, as well as the nozzle tip 12, may, be provided by suitable means such as, for example, pneumatic vibrators. A pneumatic vibrator for the nozzle tip 12 is illustrated at 58. A similar pneumatic vibrator may also be provided for the container 16. In addition to the heat and vibration, the canister 16 may be pressurized by argon or other inert gas in order to assist in maintaining the powder in a dry and freely flowing state. The argon gas is supplied through an inlet 20 at the top of the container 16. A regulator and flow meter (not shown) may suitably be provided in the argon gas inlet line 20. In order to maintain the powder in a dry and movable state during shipping and storage, the inlet and outlet of the container 16 are provided with suitable caps (not shown) for sealing the canister 16. The powder is discharged through an outlet 22 at the bottom of the container 16, the outlet being provided with a Parker fitting 24 or other suitable connector.

The powder is transported via a flexible tube 26 to a powder dispensing head 28 where precise amounts of the fine powder are measured and delivered to the final dispensing nozzle 12. Parker fittings 30 and 34 or other suitable connectors are provided on the ends respectively of the tube 26. The flexible tube 26 is connected to the canister outlet 22 by means of Parker fittings 24 and 30 or other suitable connecting means and is connected to the inlet 32 of the powder measuring head 28 by means of Parker fitting 34 or other suitable connector. The powder measuring head 28 will be discussed in greater detail hereinafter.

Figure 11:
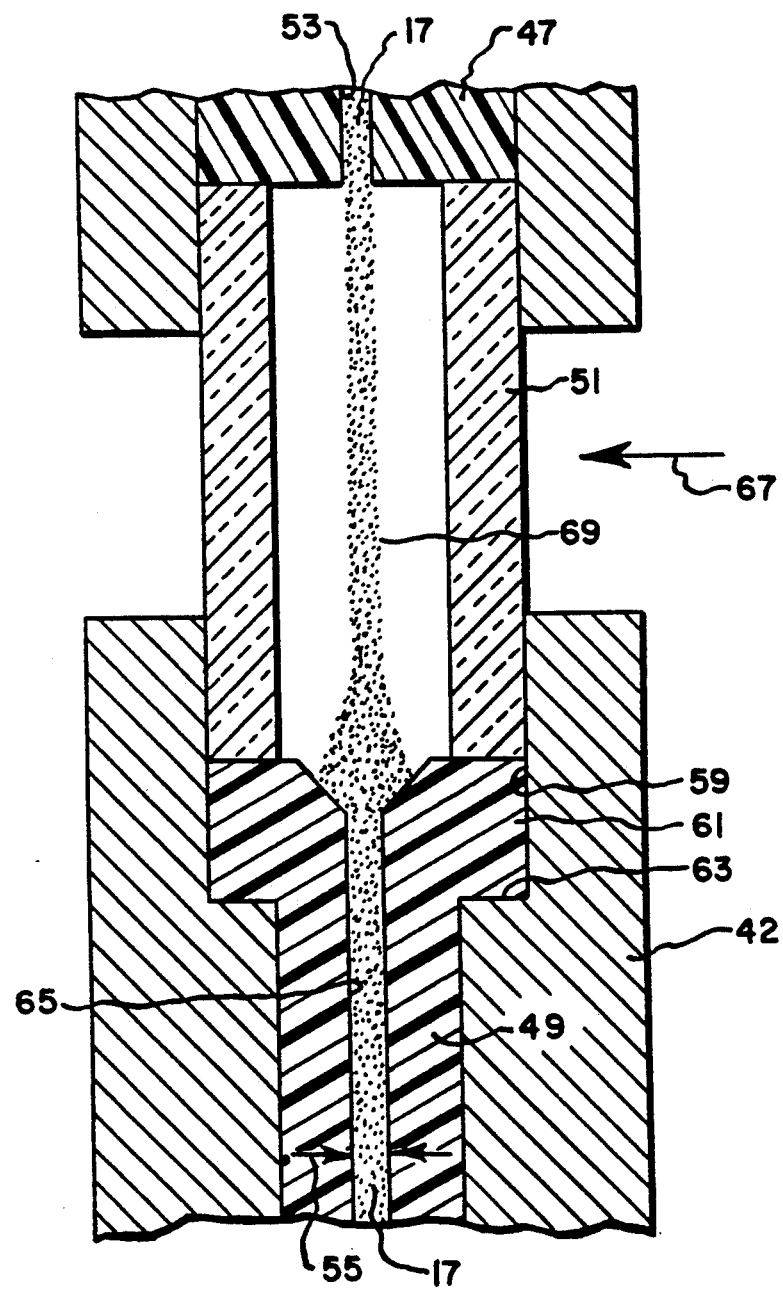
FIG. 11 is a partial sectional view of the director tube assembly providing powder flow from the powder dispensing head of the apparatus of FIG. 1.

The outlet or dropout area 40 of the measuring head collects the metered powder via slot 43 and directs it downwardly into an inlet port located at the top of a powder director tube 42, composed of brass or other suitable material and which may be suitably water cooled as a means of dissipating reflected heat from the laser/powder welding process. The tube 42 is connected to the outlet 40 of the measuring head by means of suitable Parker fittings 44 and 46 or by other suitable means. Referring to FIG. 11, at 47 and 49 are illustrated nylon condensing fittings for directing the powder into narrow channels 53 and 65 respectively, each of which may have a diameter, illustrated at 55, of perhaps about 0.060 inch, so that the powder 17 is condensed into steady streams. The director tube 42 comprises a hexagonal piece of bar stock perhaps 3 inches long with a bore 59 and milled away to the bore 59 on each side about midlength thereof. A glass sleeve 51 having an outer diameter of perhaps ⅜ inch and an inner diameter of perhaps 3/16 inch is inserted inside the bore 59 between the fittings 47 and 49 to allow viewing of powder flow through the director tube visually, as illustrated at 67, for detecting low canister level or end of powder flow. Upper condensing fitting 47 provides a steady stream, illustrated at 69, of powder through glass tube 51 so that powder flow can be easily observed. Lower condensing fitting 49 provides a non-accumulating steady stream of powder flow to the nozzle tip 12. Condensing fitting 49 has an increased diameter upper portion 61 which engages, i.e., rests on a bore shoulder 63 to precisely locate fitting 49. The lower end of the glass tube engages the upper end of fitting 49. Similarly, fitting 47 engages the upper end of the glass tube. If desired, a Keyence optical passage sensor may alternatively or additionally be mounted to tube 26 and/or at the entry to the nozzle to provide a low or no powder warning signal.

The lower end of the director tube 42 is suitably connected, such as by a pipe fitting, to the upper end of the powder feed nozzle assembly, indicated generally at 48, which includes a powder feed nozzle 52 for delivering the powder to the tip 12. The nozzle 52 has water cooling channels, illustrated at 54, in order to dissipate reflected heat from the laser/powder welding process.

The nozzle 52 has approximately a 45° bend at its lower end so as to position the tip 12 appropriately at the point of weld, leading the laser impingement point, with the nozzle 52 out of the way of the laser-welding apparatus. The nozzle tip 12 is removable and replaceable as well as rotatable by means of fitting 56 so that the tip orifice size may be changed as desired, only the tip needs to be changed if it is burned up, and the new tip can be put on without repositioning powder flow.

The canister holder 14 is suitably supported by a stationary support post 62 which is inserted in and welded to support post 60. The holder 14 is adjustably mounted to post 62 for up and down movement by means of Jergens handle 64, or other suitable means, slidable along post 62. This allows the nozzle position to be adjusted, as hereinafter discussed, without kinking or the like of the flexible tube 26.

Referring to FIG. 3, the powder measuring head 28 includes a shaft 66 to which are attached, as described hereinafter, a suitable number of perhaps 4 wheels 70 within a housing 72. A circular opening 74 is provided in the face of the housing 72 for insertion of the wheels 70. The opening 74 has a slightly larger diameter than the diameter of the cavity 76 in which the wheels are located so as to provide a shoulder 78. A closure member 80 having an inner portion with a diameter substantially equal to the diameter of opening 74 is provided to engage the shoulder 78 to close the opening 74 and is attached to the housing by means of a plurality of perhaps 4 thumbscrews 82.

Figure 10:
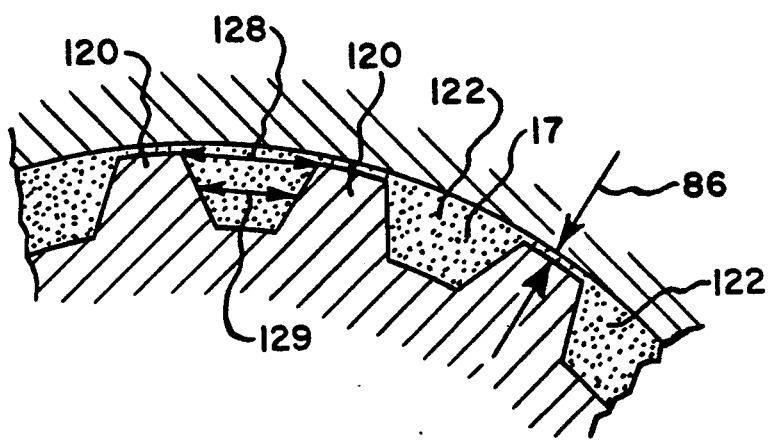
FIG. 10 is partial sectional view of one of the wheels of FIG. 4 taken along lines 10—10 thereof.

The peripheral edges 84 of the wheels are sized to have a close clearance, illustrated at 86 in FIG. 10, with the housing 72 so as to prevent excess quantities of powder 17, which may typically have a pellet diameter of about 0.003 to 0.007 inch for typical laser welding operations, from passing between the wheel peripheral edges 84 and the housing 72, and thereby disadvantageously interfering with precise metering of powder to the nozzle tip 12. The clearance 86 is preferably small enough, preferably about 0.005 inch or less, so that there are minimal effects of powder flow into the clearance.

The wheels 70 are also packed within the cavity 76 in close engagement with each other and with the housing 72 and cover member 80 so as to also prevent entry of powder therebetween. A Forsheda circular V-ring 88 is provided in a circumferential groove in the housing 72 to face the wheels 70 to prevent powder from passing along the inner wheel side. Similarly, a Forsheda circular V-ring 90 is provided in a circumferential groove in the cover member 80 to face the wheels 70 to prevent powder from passing along the outer wheel side.

The shaft 66 is driven by a suitable motor 92 which develops adequate torque to overcome any jamming tendency of powder in the clearance 86. Motor 92 is mounted within a suitable cylindrical housing 94. A suitable bracket 98 is provided for mounting the motor housing 94. One end of the motor housing 94 is closed by a plate 100 which is attached thereto by a plurality of bolts 102. An Amphenol connector 104 is mounted in a central aperture in the plate 100. Electrical current for operation of the motor 92 for rotation of the wheels 70 is provided from controller 106 through lines 108 and 110.

The other end of the motor cylindrical housing 94 is attached to an end plate 95 by means of a plurality of bolts 97, and the end plate 95 is attached to the housing 72 by means of a plurality of bolts 96. A roll pin 99 attaches the shaft 66 to a collar 101, and the wheels 70 are attached to the collar 101 by means of key 68 to insure that all of the wheels 70 rotate together or as a unit.

Compared to typical powder feed applications, a small but precise flow rate, within the range of perhaps 2 to 40 grams per minute depending on the application, is required for the laser-welding process. Not only must the particular required quantity be precise but it should be provided consistently, that is, not in spurts, to the welding zone. In order to provide such a precise flow rate, in accordance with the present invention the wheels 70 have cavities in their peripheral edges which are substantially evenly spaced entirely about the wheel periphery and sized to hold substantially equal volumes, and the motor 92 is velocity feed-back controlled so that a constant precise motor velocity coupled with substantially equally spaced discrete equal volumes of powder are supplied to the head outlet 40, as will be described in greater detail hereinafter.

Motor velocity is adjusted by the controller 106 which is provided with velocity feed-back from a suitable tachometer 112 which is mounted on the shaft 66 and which transmits a signal representative of the motor velocity through lines 114 and 116 to the controller 106 which is suitably programmed, in accordance with principles commonly known to those of ordinary skill in the art to which this invention pertains, to accordingly adjust the motor velocity, in response to the feed-back signal, to the desired velocity for the welding operation.

Figure 4:
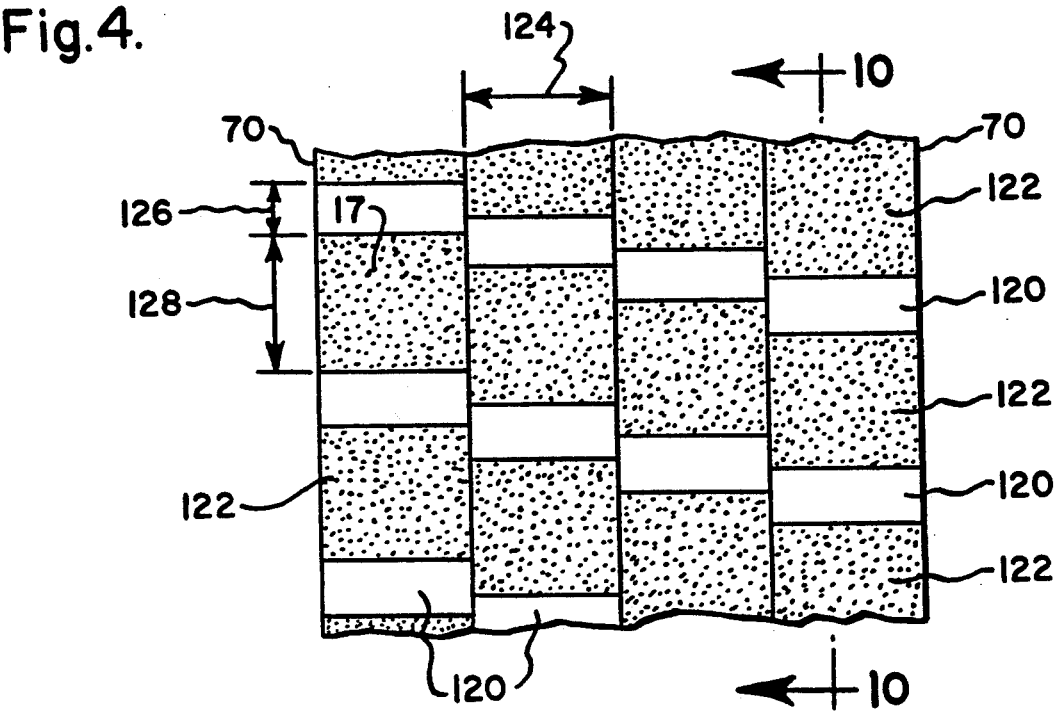
FIG. 4 is an enlarged schematic view illustrating a cavity means portion in the peripheral edges of the motorized wheels shown in FIG. 3.

Referring to FIG. 4, there is shown an enlarged view of a portion of the peripheral surface of the wheels 70 used to precisely transport precise discrete portions of the powder 17 between the inlet 32 and the outlet 40. Each wheel 70 suitably comprises a gear having a plurality of circumferentially spaced teeth 120, and the powder 17 flows into the cavities 122 between the teeth. The teeth 120 are evenly spaced about the periphery of the wheel 70 so that the cavities 122 are evenly spaced and contain substantially identical volumes so that the output can be precisely controlled by varying the speed of the motor 92. The width, illustrated at 126, circumferentially of each gear tooth along its crown or peripheral surface may be perhaps 0.040 inch. The length, illustrated at 128, of each cavity 122 along the gear peripheral surface may perhaps be 0.085 inch. Each cavity 122 tapers inwardly to a width, illustrated at 129 in FIG. 10, midway of its height of perhaps 0.050 inch. Each cavity 122 may have a volume of perhaps 0.001 cubic inch, which is on the order of a tenth of the volume of the Triten Metalmeter device cavities.

During the revolution of a single wheel 70 the alternating gear teeth 120 and cavities 122 will result in what might be termed "pulses" of powder flow from that single wheel wherein powder flow will occur when a cavity 122 reaches the outlet, and after the cavity passes the outlet there will be a period of time before the next cavity reaches the outlet for additional powder flow. This is less of a problem when greater volumes of perhaps 35 to 40 grams per minute are required because of the increased velocity required of the wheel. However, this may increasingly present a problem toward the low end of the velocity range, i.e., below about 12 grams per minute, since the resultingly lower velocities required may result in a more lumpy weld appearance which mimics the frequency of the pulses. Not only is such a lumpy appearance not aesthetically pleasing but the resulting periodic low weld spots also increase the susceptibility of the weld to defects. Either a weaker weld will result or more powder weld material must be placed to compensate for low weld spots.

In order to reduce the tendency of the powder to be discharged in pulses so that a more constant bead for a more stable weld may be obtained, in accordance with the present invention the wheel cavities 122 may be increased in number, made smaller in volume, and staggered side-by-side, and the speed of the wheel increased. Thus, a plurality of the wheels 70 are provided and keyed to the collar 101 so that their cavities 122 overlap cavities on adjacent wheels. For example, as shown in FIG. 4, there may be provided 4 such wheels 70 with each of the cavities 122 offset from the respective cavities in an adjacent wheel by ¼ of the cavity length 128 with the cavities in the outer wheels similarly offset. A gear 70 may, for example, have a pitch of 48 and a width, illustrated at 124, of perhaps ⅛ inch for an overall width of the 4 gears of ½ inch. The pitch is the number of teeth which the gear contains. The amount of offset of each cavity 122 from a cavity in an adjacent wheel is perferably equal to the reciprocal of the number of wheels, i.e, for 6 wheels, each cavity 122 would be offset from a cavity of an adjacent wheel a distance equal to 1/6 of the cavity length.

Figure 5:
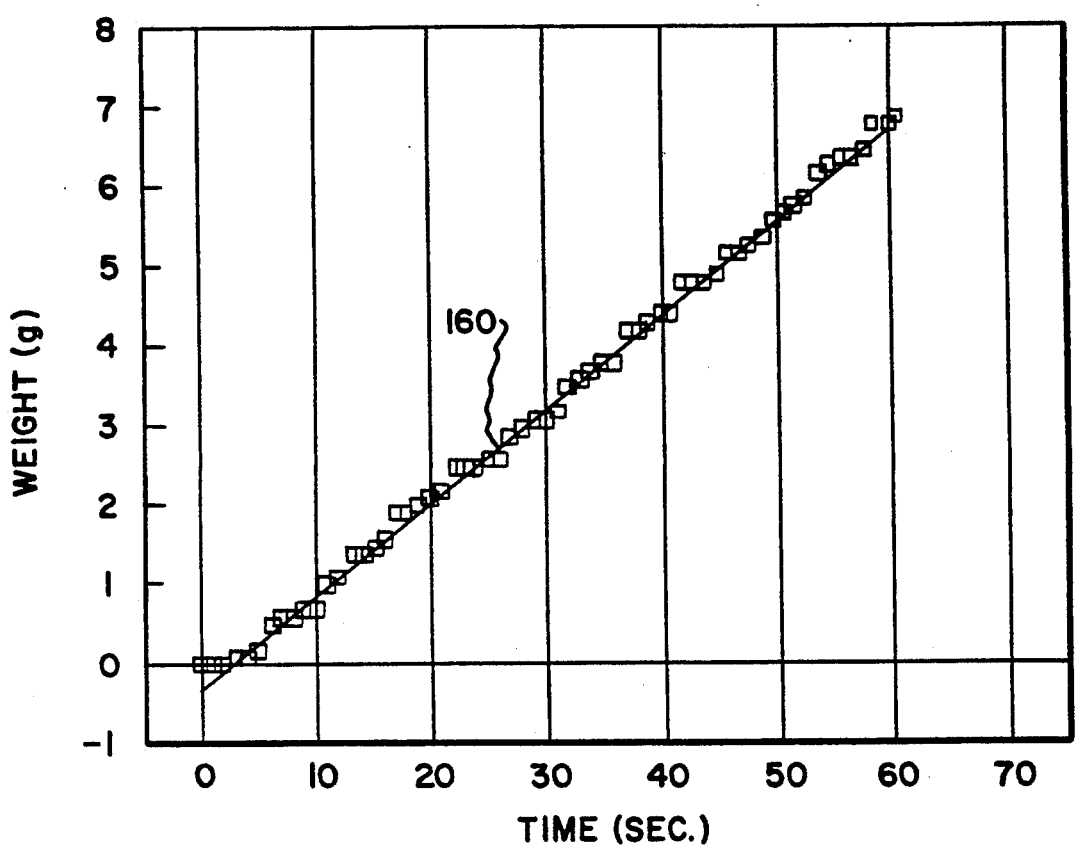
FIG. 5 is a representative graph illustrating the uniformity of powder flow rate for the apparatus of FIGS. 1 to 4.

FIG. 5 illustrates the preciseness of flow rate uniformity which can be achieved using the apparatus as described for FIGS. 1 to 4 for depositing a low volume of about 7.1 grams per minute of powder, as evidenced by the total powder flow at any point in time being close to the ideal represented by straight line 160. Such a flow rate uniformity correlates to a uniform bead placement for a more aesthetically pleasing as well as stronger weld for the amount of powder deposited.

Figure 6:
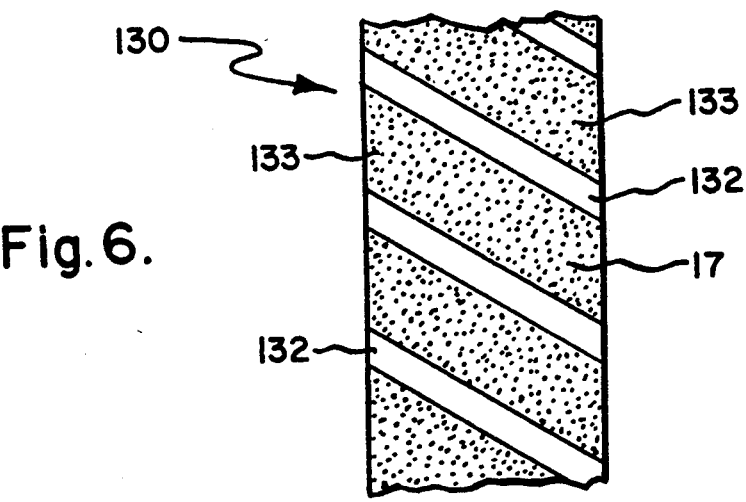
FIG. 6 is view similar to that of FIG. 4 of an alternative embodiment of the wheel cavities.

Referring to FIG. 6, there is illustrated at 130 an alternative wheel embodiment wherein a single helical gear is provided to take the place of the plurality of gears shown in FIG. 4. Gear 130 has a plurality of helical teeth 132 extending at an angle across the face of the gear to provide therebetween helical cavities 133 which overlap each other circumferentially so as to provide precise measurements of powder in each cavity 133 yet provide a substantially constant flow of the powder through the outlet 40.

Figure 8:
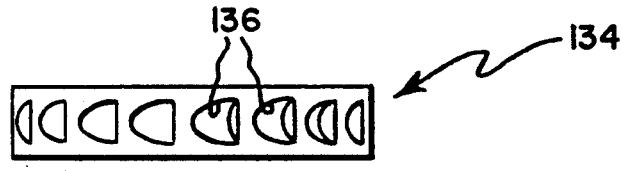
FIG. 8 is a peripheral edge view of the wheel of FIG. 7.
Figure 7:
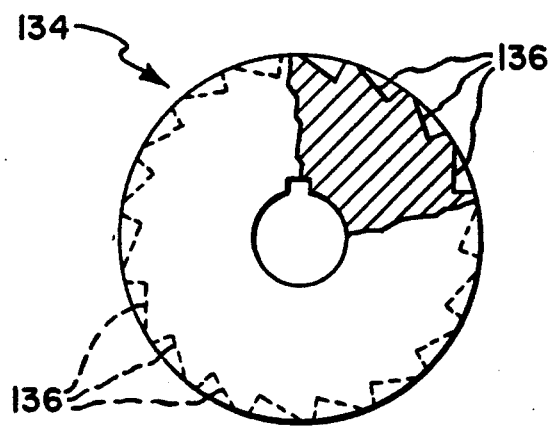
FIG. 7 is a front view of a wheel, in accordance with an alternative embodiment, for the apparatus of FIGS. 1 and 2.

Referring to FIGS. 7 and 8, there is illustrated another wheel embodiment wherein a wheel 134 has formed in its peripheral surface a plurality of evenly circumferentially spaced cavities 136 each of which contains an equal volume of powder.

Figure 9:
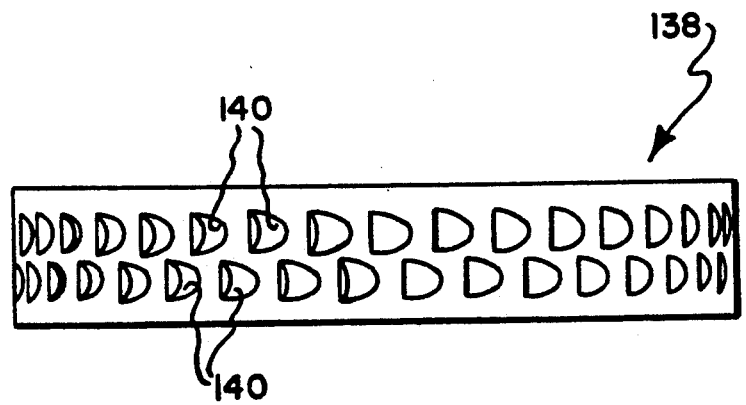
FIG. 9 is a peripheral edge view, similar to that of FIG. 8, of a wheel in accordance with another wheel embodiment.

Referring to FIG. 9, there is shown another wheel embodiment wherein a wheel 138 contains a pair of rows of cavities 140, similar to cavities 136, wherein the cavities of one row overlap the cavities of the other row so as to provide a more precise powder flow rate while minimizing the lumpy appearance. A greater number of rows of cavities may be provided to achieve an even more precise powder flow rate.

Referring back to FIG. 3, in order to achieve the desired uniform flow rate for a particular welding operation, the motor 92 is controlled by controller 106 which receives feed-back of the motor velocity from the tachometer 112 for adjusting the motor velocity to the precise motor velocity required. The controller can be advantageously interfaced directly with a CNC system to permit changing powder flow rates both during a welding run and/or during a varying welding program. In the absence of CNC interface, the system can be utilized as a pre-settable fixed-rate system. The controller 106 may be operated on perhaps 115 volt, single-phase, 50 or 60 Hertz primary power. CNC interface signals may be 0 to 10 volts DC (analog) or can accept an optional nine-bit digital input. Non-CNC system interface must be via contact closure signal.

The replacement of the tip 12 may result in inaccuracies relative to the positioning of the powder stream which is desirably precisely positioned at an appropriate in-line/lateral and height location to assure the most effective welding results. Referring to FIGS. 1 and 2, fine tuning of the tip position for precise positioning thereof is preferably obtained, in accordance with the present invention, by a tri-axial cross-slide assembly which provides adjustments along x, y, and z axes. The assembly of slides is attached to the bracket 50 for movement of the nozzle 52 carrying the nozzle tip 12. By manually operating handle 64 for up or down movement of the canister holder 14, kinking of the flexible tube 26 may be prevented as the nozzle position is adjusted. The "z" slide, illustrated at 142, effects up and down movement of the nozzle 52 by turning of the hand wheel 144. Similarly, the x and y slides, illustrated at 146 and 150 respectively, effect horizontal movement in the x and y directions respectively by turning of the hand wheels 148 and 152 respectively. Such a tri-axial slide assembly can be provided using principles commonly known to those of ordinary skill in the art to which this invention pertains and is therefore not described in greater detail herein. For example, such a tri-axial slide assembly may be provided by Velimex Corporation of East Bloomfield, N.Y.

Thus, there is provided, in accordance with the present invention, a means for delivering the very fine powder required for laser-welding processes to the welding site in precisely controlled quantities. Such control is provided by a wheel or wheels which have a plurality of equally spaced equal volume cavities in their periphery for delivering discrete equal quantities of the powder from an inlet to an outlet of a powder measuring head, and the rotation of the wheel or wheels is precisely controlled by a motor feed back means wherein the motor velocity is provided as a signal to a controller which, based on the motor velocity, feeds back a signal to the motor to increase or decrease the velocity to achieve the precise velocity required. In order to minimize the lumpy appearance of a weld which may result from pulses of the powder being delivered thereto, overlapping powder cavities are provided so as to provide a more precise uniformity of powder flow. In order to precisely position the powder stream to the weld site to account for differences in replacement of nozzle tips and any other inaccuracies, the nozzle tip position is adjusted by a tri-axial cross-slide assembly. The provision of the controller for motor feed-back control allows the system to be interfaced directly with a CNC system to permit changing powder flow rates both during a welding run and/or during a varying welding program.

It is to be understood that the invention is by no means limited to the specific embodiments which have been illustrated and described herein and that various modifications thereof may indeed be made which come within the scope of the present invention as defined by the appended claims.

What is claimed is:

1. Powder feed apparatus for welding comprising powder containing means, nozzle means for depositing the powder into the path of a welding energy source, means for metering flow of the powder to said nozzle means, and means for flowing the powder from said containing means to said metering means, said metering means comprising a housing, at least one wheel rotatable within said housing and having a peripheral edge, at least one plurality of cavity means in said wheel peripheral edge, said plurality of cavity means being substantially evenly spaced entirely about the wheel periphery and being sized to hold substantially equal volumes, inlet means in said housing for delivering the powder from said containing means to said cavity means, outlet means in said housing for delivering the powder from said cavity means to said nozzle means, said wheel peripheral edge having a close clearance with said housing whereby to entrap for delivery to said outlet means discrete precise quantities of the powder in said cavity means respectively, and a velocity feed-back controlled motor connected to said wheel whereby the flow rate of the powder to said nozzle means may be precisely controlled, wherein said nozzle means has a tip means defining an outlet therefrom, the apparatus further comprising means for tri-axially positioning said tip means.

2. Powder feed apparatus for welding comprising powder containing means, nozzle means for depositing the powder into the path of a welding energy source, means for metering flow of the powder to said nozzle means, and means for flowing the powder from said containing means to said metering means, said metering means comprising a housing, at least one wheel rotatable within said housing and having a peripheral edge, at least one plurality of cavity means in said wheel peripheral edge, said plurality of cavity means being substantially evenly spaced entirely about the wheel periphery and being sized to hold substantially equal volumes, inlet means in said housing for delivering the powder from said containing means to said cavity means, outlet means in said housing for delivering the powder from said cavity means to said nozzle means, said wheel peripheral edge having a close clearance with said housing whereby to entrap for delivery to said outlet means discrete precise quantities of the powder in said cavity means respectively, and a velocity feed-back controlled motor connected to said wheel whereby the flow rate of the powder to said nozzle means may be precisely controlled, wherein said clearance is up to about 0.005 inch.

3. Apparatus according to claim 2 wherein said wheel comprises a gear having teeth which comprise said cavity means.

4. Apparatus according to claim 2 wherein said wheel comprises a gear having helical teeth which comprise said cavity means, said cavity means overlapping circumferentially to provide a constant powder flow.

5. Apparatus according to claim 1 wherein said wheel comprises a gear having teeth which comprise said cavity means, said cavity means overlapping circumferentially to provide a constant powder flow.

6. Apparatus according to claim 2 wherein said powder containing means comprises a holder for a powder canister, and the apparatus further comprises means for vibrating and pressurizing the canister and for heating the powder therein to facilitate free flow of the powder.

7. Apparatus according to claim 2 further comprising channel means in said nozzle means for flowing water for cooling thereof.

8. Powder feed apparatus for welding comprising powder containing means, nozzle means for depositing the powder into the path of a welding energy source, means for metering flow of the powder to said nozzle means, and means for flowing the powder from said containing means to said metering means, said metering means comprising a housing, at least one wheel rotatable within said housing and having a peripheral edge, at least one plurality of cavity means in said wheel peripheral edge, said plurality of cavity means being substantially evenly spaced entirely about the wheel periphery and being sized to hold substantially equal volumes, inlet means in said housing for delivering the powder from said containing means to said cavity means, outlet means in said housing for delivering the powder from said cavity means to said nozzle means, said wheel peripheral edge having a close clearance with said housing whereby to entrap for delivery to said outlet means discrete precise quantities of the powder in said cavity means respectively, and a velocity feed-back controlled motor connected to said wheel whereby the flow rate of the powder to said nozzle means may be precisely controlled, wherein said nozzle means has a replaceable tip mans defining an outlet therefrom.

9. Apparatus according to claim 8 further comprising means for tri-axially positioning said tip means.

10. Powder feed apparatus for welding comprising powder containing means, nozzle means for depositing the powder into the path of a welding energy source, means for metering flow of the powder to said nozzle means, and means for flowing the powder from said containing means to said metering means, said metering means comprising a housing, at least one wheel rotatable within said housing and having a peripheral edge, at least one plurality of cavity means in said wheel peripheral edge, said plurality of cavity means being substantially evenly spaced entirely about the wheel periphery and being sized to hold substantially equal volumes, inlet means in said housing for delivering the powder from said containing means to said cavity means, outlet means in said housing for delivering the powder from said cavity means to said nozzle means, said wheel peripheral edge having a close clearance with said housing whereby to entrap for delivery to said outlet means discrete precise quantities of the powder in said cavity means respectively, and a velocity feed-back controlled motor connected to said wheel whereby the flow rate of the powder to said nozzle means may be precisely controlled, wherein each said cavity means has a volume of about 0.001 cubic inch.

11. Powder feed apparatus for welding comprising powder containing means, nozzle means for depositing the powder into the path of a welding energy source, means for metering flow of the powder to said nozzle means, and means for flowing the powder from said containing means to said metering means, said metering means comprising a housing, at least one wheel rotatable within said housing and having a peripheral edge, at least one plurality of circumferential rows of cavity means in said peripheral edge means, said cavity means of each of said circumferential rows being substantially evenly spaced entirely about the wheel periphery and being sized to hold substantially equal volumes, inlet means in said housing for delivering the powder from said containing means to said cavity means, outlet means in said housing for delivering the powder from said cavity means to said nozzle means, said peripheral edge means having a close clearance with said housing whereby to entrap for delivery to said outlet means discrete precise quantities of the powder in said cavity means respectively, and a velocity feed-back controlled motor connected to said wheel means whereby the flow rate of the powder to said nozzle means may be precisely controlled, said cavity means overlapping circumferentially cavity means in at least one adjacent one of said rows to provide a constant powder flow.

12. Apparatus according to claim 11 wherein said nozzle means has a tip means defining an outlet therefrom, the apparatus further comprising means for tri-axially positioning said tip means.

13. Apparatus according to claim 11 wherein said wheel means comprises a plurality of gears having teeth which comprise said cavity means.

14. Apparatus according to claim 11 wherein said clearance is up to about 0.005 inch.

15. Apparatus according to claim 11 wherein said powder containing means comprises a holder for a powder canister, and the apparatus further comprises means for vibrating and pressurizing the canister and for heating the powder therein to facilitate free flow of the powder.

16. Apparatus according to claim 11 further comprising channel means in said nozzle means for flowing water for cooling thereof.

17. Apparatus according to claim 11 wherein each said cavity means has a volume of about 0.001 cubic inch.

18. Apparatus according to claim 11 wherein said nozzle means has a replaceable tip means defining an outlet therefrom.

19. Apparatus according to claim 18 further comprising means for tri-axially positioning said tip means.

20. Apparatus according to claim 8 wherein said wheel comprises a gear having teeth which comprise said cavity means, said cavity means overlapping circumferentially to provide a constant powder flow.

* * * * *